(12) United States Patent
Vauchel et al.

(10) Patent No.: US 8,876,018 B2
(45) Date of Patent: Nov. 4, 2014

(54) ARRANGEMENT OF THRUST REVERSER FLAP LINK RODS ON THE INTERNAL FIXED STRUCTURE OF A TURBOJET ENGINE NACELLE

(71) Applicant: Aircelle, Gonfreville l'Orcher (FR)

(72) Inventors: Guy Bernard Vauchel, Harfleur (FR); Peter Segat, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/656,948

(22) Filed: Oct. 22, 2012

(65) Prior Publication Data

US 2013/0062434 A1 Mar. 14, 2013

Related U.S. Application Data

(63) Continuation of application No. PCT/FR2011/050629, filed on Mar. 24, 2011.

(30) Foreign Application Priority Data

Apr. 20, 2010 (FR) ...................................... 10 52972

(51) Int. Cl.
| | |
|---|---|
| *B63H 11/00* | (2006.01) |
| *B64D 33/04* | (2006.01) |
| *F02K 1/00* | (2006.01) |
| *F02K 3/02* | (2006.01) |
| *F02K 1/62* | (2006.01) |
| *F16C 7/02* | (2006.01) |
| *F02K 1/72* | (2006.01) |
| *B64D 29/06* | (2006.01) |
| *F02K 1/76* | (2006.01) |

(52) U.S. Cl.
CPC ................. *F02K 1/62* (2013.01); *Y02T 50/672* (2013.01); *F16C 7/02* (2013.01); *F02K 1/72* (2013.01); *B64D 29/06* (2013.01); *F02K 1/763* (2013.01); *B64D 33/04* (2013.01)
USPC ... 239/265.19; 60/226.2; 60/230; 239/265.33

(58) Field of Classification Search
CPC ............ F02K 1/002; F02K 1/06; F02K 1/09; F02K 1/30; F02K 1/50; F02K 1/54; F02K 1/566; F02K 1/58; F02K 1/605; F02K 1/70; F02K 1/72; F02K 1/763; F02K 1/766; B64D 29/06; B64D 33/04; Y02T 50/433; Y02T 50/672
USPC ............... 60/226.2, 230; 239/265.11, 265.19, 239/265.23, 265.33
See application file for complete search history.

(56) References Cited

U.S. PATENT DOCUMENTS

| 4,564,160 A * | 1/1986 | Vermilye .................. 244/110 B |
|---|---|---|
| 6,440,521 B1 * | 8/2002 | Moore ............................ 428/73 |
| 6,688,099 B2 * | 2/2004 | Lair ............................. 60/226.2 |
| 2009/0151320 A1 | 6/2009 | Sternberger |

FOREIGN PATENT DOCUMENTS

| EP | 1495963 | 1/2005 |
|---|---|---|
| FR | 2 920 197 | 2/2009 |
| FR | 2920199 | 2/2009 |
| FR | 2930973 | 11/2009 |
| GB | 2259954 | 3/1993 |

OTHER PUBLICATIONS

PCT/FR2011/050629 International Search Report, Jun. 2011.

* cited by examiner

*Primary Examiner* — Phutthiwat Wongwian
*Assistant Examiner* — Arun Goyal
(74) *Attorney, Agent, or Firm* — Brinks Gilson & Lione

(57) ABSTRACT

An arrangement is provided that includes a thrust reverser flap link rod on an internal fixed structure of a turbojet engine nacelle. The link rod is connected to the internal fixed structure by an elastic means that is a spring.

Figure 1:
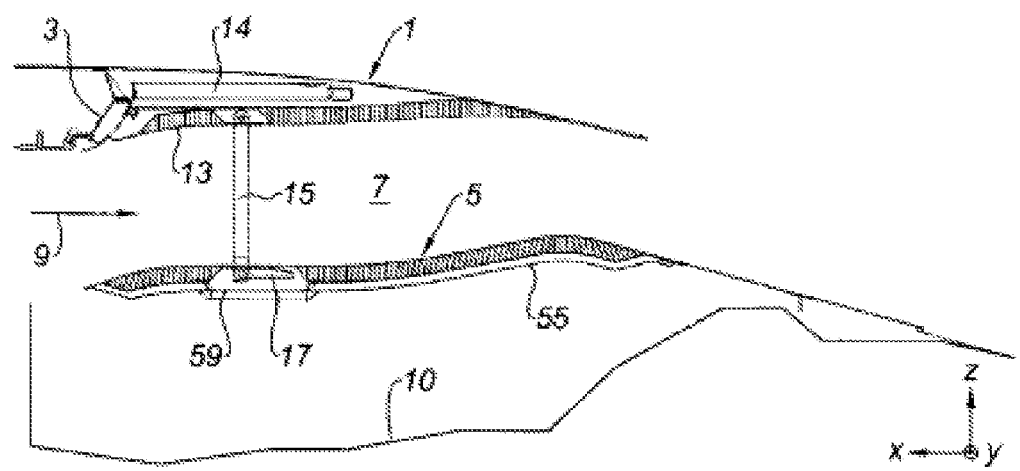

10 Claims, 4 Drawing Sheets ion No. PCT/FR2011/050629 filed on Mar. 24, 2011,
ARRANGEMENT OF THRUST REVERSER FLAP LINK RODS ON THE INTERNAL FIXED STRUCTURE OF A TURBOJET ENGINE NACELLE

CROSS-REFERENCE TO RELATED APPLICATIONS

This application is a continuation of International Application No. PCT/FR2011/050629 filed on Mar. 24, 2011, which claims the benefit of FR 10/52972, filed on Apr. 20, 2010. The disclosures of the above applications are incorporated herein by reference.

FIELD

The present disclosure relates to an arrangement of thrust reverser link rods on the internal fixed structure of a turbojet engine nacelle.

BACKGROUND

The statements in this section merely provide background information related to the present disclosure and may not constitute prior art.

As is known in itself, a cascade-type thrust reverser for an aircraft turbojet engine typically comprises a plurality of flaps secured to the sliding cowl of that reverser, cooperating with link rods connected to the internal fixed structure of the thrust reverser.

When the thrust reverser operates in the direct jet mode, the link rods keep the flaps in the extension of the inner wall of the sliding cowl.

When the thrust reverser operates in the reverse jet mode, the flaps are actuated by the link rods so as to obstruct the circulation cavity for the secondary air of the turbojet engine, and to thereby deflect the secondary air tunnel forward, making it possible to achieve thrust reversal and therefore braking of the aircraft equipped with such a reverser.

It is known to place springs between the link rods and the flaps, so as to compensate for the allowance gaps and structural deformations when the flaps are in the "direct jet" position, while allowing the link rods to provide sufficient pressure on those flaps in that position.

Different types of springs have been used to date, such as helical, strip, or U-shaped, as for example taught in prior document FR 2 920 197.

In nacelles with a recent design, an effort is made to reduce the radial thickness of the thrust reverser device as much as possible in the area of the cascade vanes, so as to improve the nacelle in terms of both weight and aerodynamics.

However, the aforementioned springs have a radial bulk that is counter to this thickness reduction.

Furthermore, in certain cases, the travel of the end of each link rod connected by a spring to its associated reverser flap, during pivoting of that flap, requires additional space that is incompatible with the aforementioned constraints relative to reducing the radial thickness.

SUMMARY

The present disclosure thus provides elastic means for connecting the rods to their surrounding area that are compatible with the aforementioned radial thickness reduction.

In one form of the present disclosure, at least one thrust reverser flap link rod on the internal fixed structure of a turbojet engine nacelle, in which said link rod is connected to the internal fixed structure by elastic means.

Owing to these features, it is no longer necessary to provide elastic connecting means between the link rod and the thrust reverser flap, which makes it possible to reduce the bulk of the cooperation area of the link rod with said flap, and therefore to reduce the radial thickness of the thrust reverser device in the area of the cascade vanes.

According to other optional features of the present disclosure:
- said elastic means comprise a U-shaped spring with two branches,
- the concavity of said spring is oriented toward the upstream direction of said nacelle: in this way, the spring better withstands the uplift forces exerted by the link rod,
- said elastic means comprise a torsion spring,
- said link rod is connected to said elastic means by a connecting pin, and said elastic means comprise shells with oblong openings receiving the ends of said pin, and capable of retaining said pin in the event the spring breaks,
- said elastic means are fastened in a hollow area of said internal fixed structure, formed on the surface of that structure that is across from said turbojet engine, and provided with an opening for passage of said link rod,
- when the internal fixed structure is made from a composite sandwich material, the hollow area is formed in a monolithic part of that material,
- said hollow area is bordered by a flange which itself is bordered by a thermally insulating cushion of the surface of the internal fixed structure situated across from the turbojet engine,
- a protective cover is attached on the flange,
- the elastic means include a stop limiting deflected shapes in the reverser mode.

The present disclosure also relates to an aircraft turbojet engine nacelle, comprising at least one arrangement according to the preceding features.

Further areas of applicability will become apparent from the description provided herein. It should be understood that the description and specific examples are intended for purposes of illustration only and are not intended to limit the scope of the present disclosure.

DRAWINGS

Figure 2:
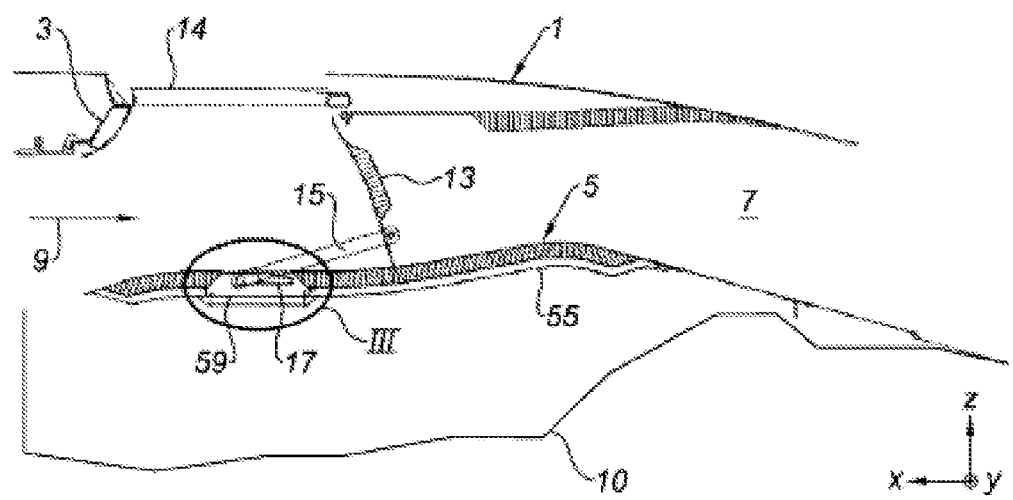
Figure 3:
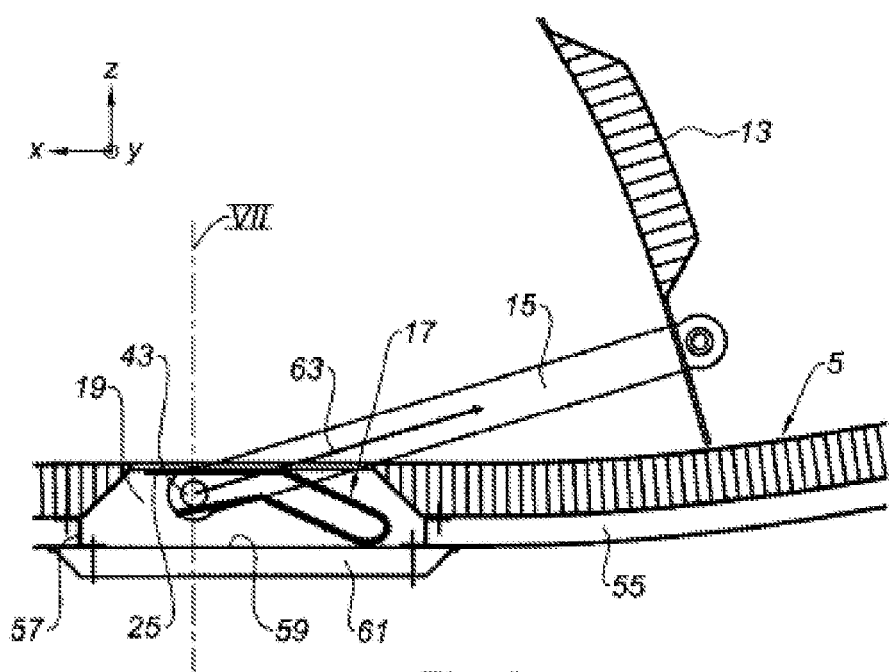
Figure 4:
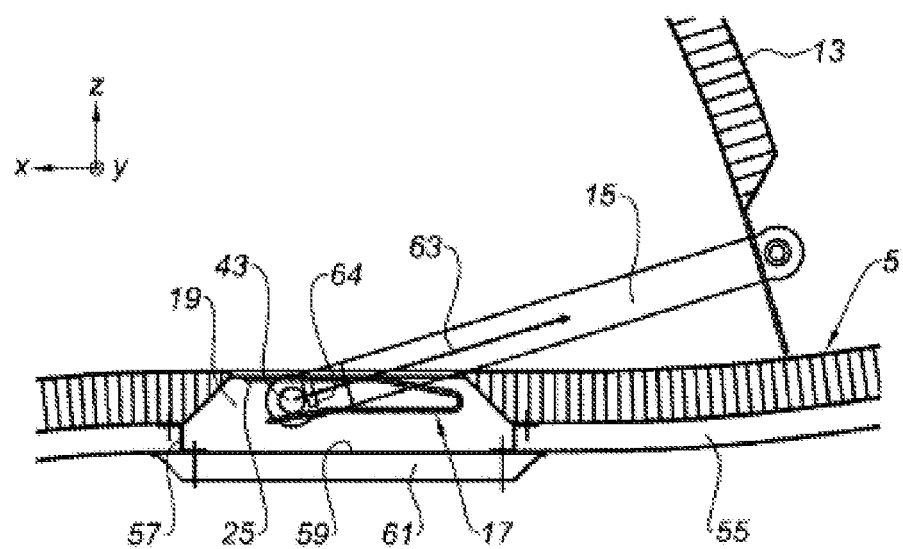
Figure 5:
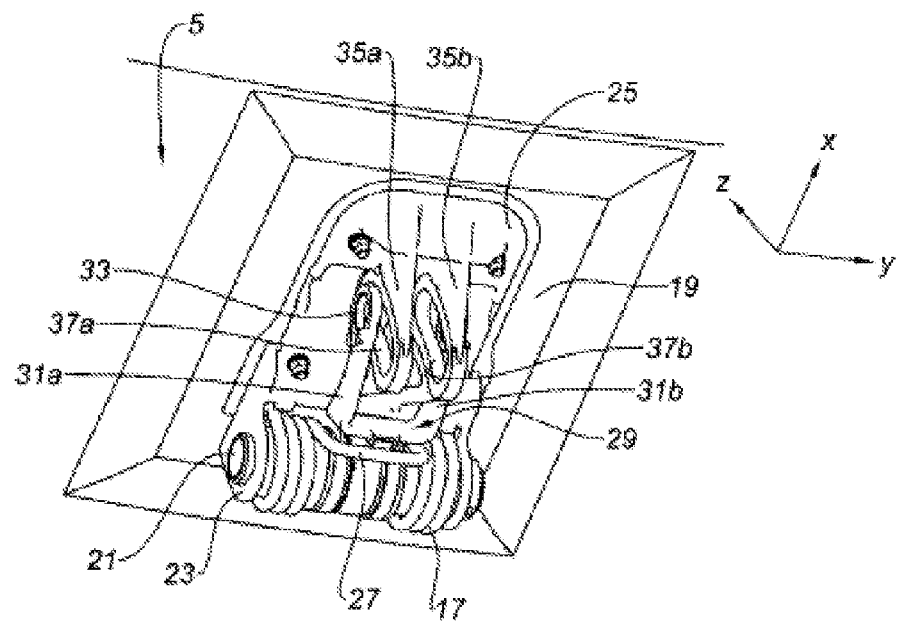
Figure 6:
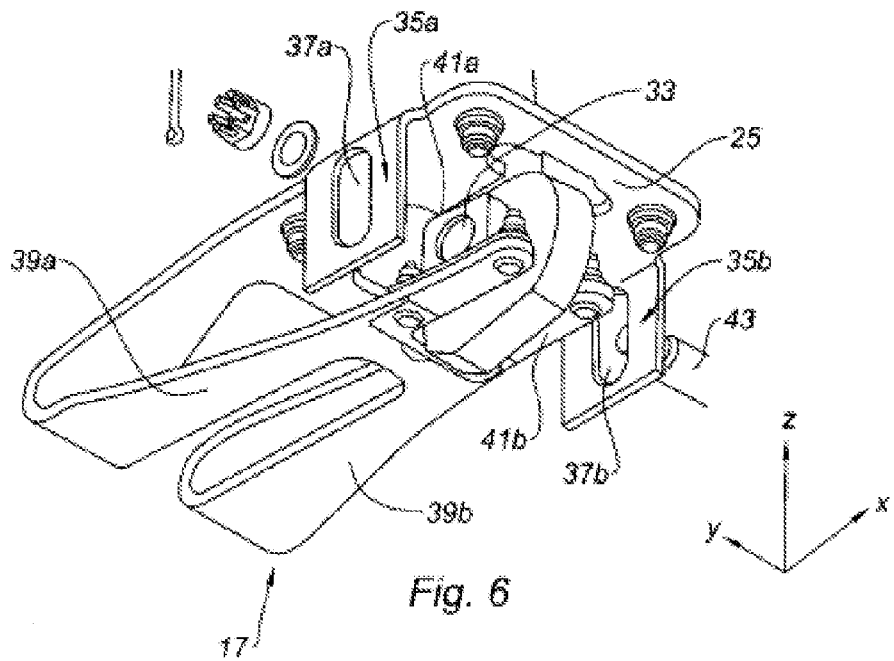
Figure 7:
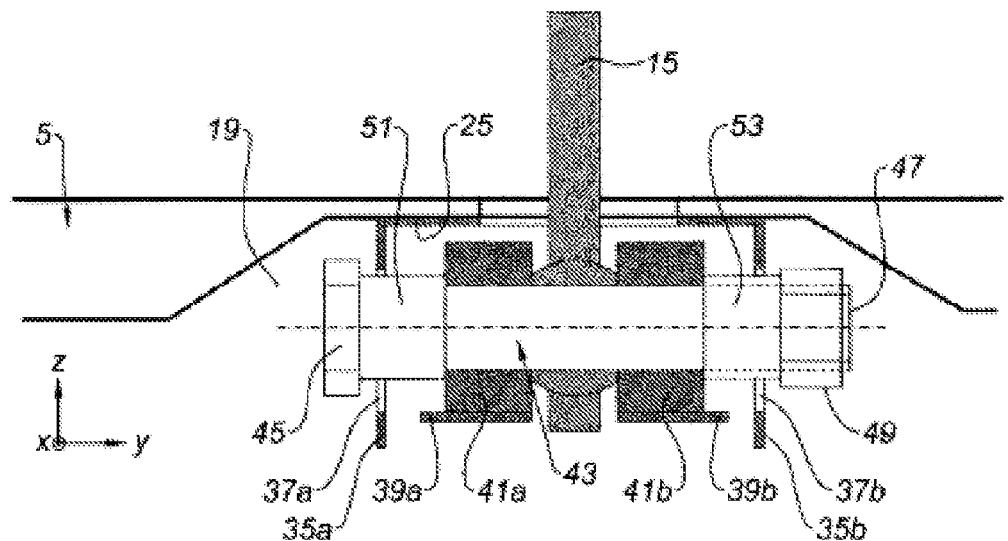
Figure 8:
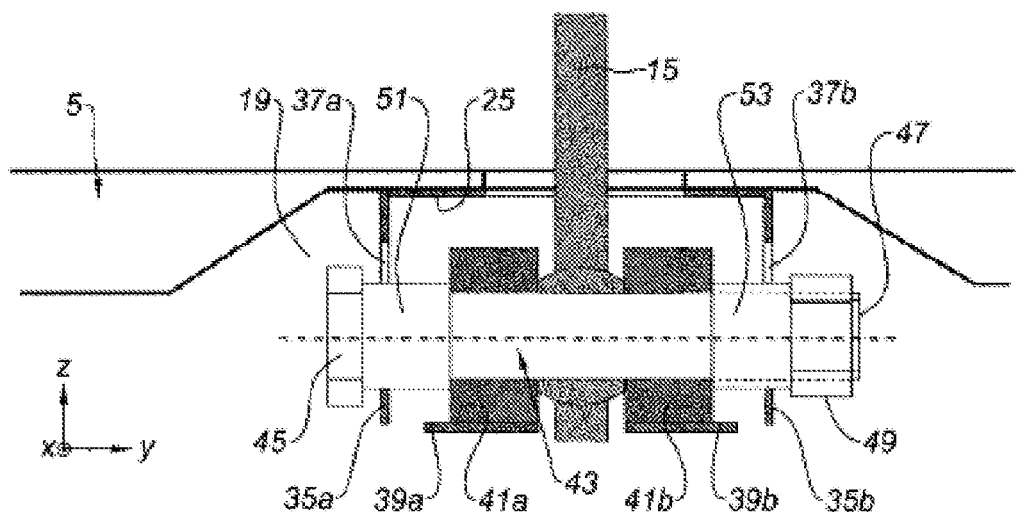

Other features and advantages of the present invention will appear upon reading the following description and upon examination of the appended figures, in which:

FIG. 1 shows an axial cross-sectional view of a cascade-type thrust reverser, incorporating the arrangement according to the invention, said reverser being shown in the direct jet position, FIG. 2 is a view similar to that of FIG. 1, the reverser being shown in the reverse jet position, FIG. 3 is a detailed view of area III of FIG. 2, FIG. 4, similar to FIG. 3, shows an alternative embodiment of the arrangement according to the invention, FIG. 5 shows a perspective view of a first embodiment of the spring of the arrangement according to the invention, FIG. 6 shows, in a partially exploded perspective view, a second embodiment of the spring of the arrangement according to the invention, FIG. 7 is a cross-sectional view in plane VII of FIG. 3, when the arrangement according to the invention incorporates a spring according to FIG. 6, and FIG. 8, similar to FIG. 7, shows the arrangement according to the invention in the event the spring breaks.

In all of these figures, identical or similar references designate identical or similar members or sets of members.

A reference XYZ has been placed on each of these figures, the three axes of which respectively represent the longitudinal, transverse, and vertical directions of the nacelle.

It should be noted that the arrow of the X axis points in the upstream direction of the nacelle, this term being understood in relation to the flow of air designed to pass through the nacelle during operation.

The drawings described herein are for illustration purposes only and are not intended to limit the scope of the present disclosure in any way

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a cascade-type thrust reverser, typically comprising a cowl 1 slidingly mounted in relation to a stationary structure, which comprises a stationary front frame 3 and an internal fixed structure 5.

As is known in itself, the sliding cowl and the internal fixed structure 5 define an annular cold air tunnel 7 between them.

In the normal operating mode, i.e. during cruising, the cold air circulates inside said tunnel 7 as indicated by the arrow 9 of FIG. 1, i.e. along the inner wall of the cowl 1 and the internal fixed structure 5.

In this operating mode, this cold air 9 is added to the hot air leaving the turbojet engine 10, thereby contributing to the thrust of an aircraft (not shown).

In thrust reverser mode (see FIG. 2), the sliding cowl 1 circulates toward the rear of the turbojet engine, i.e. toward the right in FIG. 2, under the effect of an actuator such as a hydraulic jack (not shown).

The sliding results in driving the covering of the annular tunnel 7 by a plurality of flaps 13 distributed all around that tunnel, only one of them being visible in FIGS. 1 and 2, and reorienting the flow of cool air toward the front of the nacelle (see arrow 9' in FIG. 2), through cascade vanes 14.

Each flap 13 is hingedly mounted on the sliding cowl 1, and its movement from the position shown in FIG. 1, in which it is situated in the extension of the inner wall of the sliding cowl 1, toward its covering position shown in FIG. 2, in which it is located passing through the cold air tunnel 7, is obtained under the action of a link rod 15 whereof the ends are pivotably mounted respectively on the internal fixed structure 5 and the flap 13.

According to the present disclosure, and as shown more particularly in FIGS. 3 and 4, the link rod 15 cooperates with the internal fixed structure 5 by means of a spring 17.

This spring 17 is placed in a hollow area 19 of the internal fixed structure 5, said hollow area being arranged across from the turbojet engine 10.

When the internal fixed structure 5 is made from a composite sandwich material, which may in particular comprise inner and outer skins and a honeycomb core in order to produce acoustic absorption, the hollow area 19 may be made up of a monolithic part of that material, i.e. a material portion in which the inner and outer skins are directly adhered to one another, without a core.

Such a monolithic portion does not have sound absorption characteristics, but has a high rigidity, favorable to fastening of the spring 17.

In a first embodiment shown in FIG. 5, one can see that the spring 17 may be of the helical type: in that case, it is mounted on a physical axle 21, which in turn is mounted on a bearing 23 fastened in the hollow area 19 of the fixed structure 5 by a plate 25.

One foot 27 of the spring 17 exerts an elastic return force on a stirrup 29 pivotably mounted on the physical axle 21, said stirrup including two branches 31a, 31b each provided with an opening 33 designed to receive a pin (not shown), and the end of the link rod 15 passes through the internal fixed structure 5 substantially at the center of the hollow area 19.

It should be noted that two shells 35a, 35b are provided secured to the plate 25, provided with respective oblong openings 37a, 37b situated across from the openings 33 of the stirrup 29.

In another embodiment shown in FIG. 6, one can see that the spring 17 is of the U-shaped type, i.e. it includes two U-shaped branches 39a, 39b, connected to one another by a plate 25 fastened inside the hollow area 19.

Each branch 39a, 39b supports a respective half-bearing 41a, 41b inside which an opening 33 is formed, said openings 33 being designed to receive the pins 43 for fastening the end of the link rod 15.

As in the preceding embodiments, two shells 35a, 35b are provided with respective oblong openings 37a, 37b situated across from the openings 33 of the half-bearings 41a, 41b. The shells 35a and 35b may be attached or may be integrated into the spring.

More specifically, in reference to FIGS. 7 and 8, one can see that the pin 43 preferably includes a head 45 and a shaft with a threaded end 47 on which a nut 49 is screwed.

Rings 51 and 53 are respectively placed between the head 45 and the half-bearing 41a, and between the half-bearing 41b and the nut 49.

These rings 51 and 53 perform a centering function, i.e. they make it possible to ensure the two ends of the pins 43 extend continuously through the two oblong openings 37a and 37b.

In this way, in the event the spring 17 breaks, in particular in the bent area of the two U-shaped branches, the pin 43 abuts against the edge of the openings 37a and 37b, as shown in FIG. 8: this pin, and therefore the link rod 15, are thus retained, which prevents escape and travel of the link rod 15 inside the cold air tunnel 7.

It should be noted that in the embodiment of FIG. 5, this blocking function in the event the spring 17 breaks is performed similarly by the shells 35a, 35b and their associated oblong openings 37a, 37b.

It will also be noted that, in the two embodiments of FIGS. 5 and 6, the oblong openings 37a and 37b also perform a function of guiding the pins 43, preventing the end of the link rod 15 from becoming off-center.

Returning now to FIGS. 3 and 4, one can see that the internal fixed structure may include a thermal protecting head 55 on the turbojet engine 10 side.

A flange (or frame) 57 may be fastened on the edge of the hollow area 19, said flange then being bordered on the periphery thereof by a thermal protection pad 55.

A protection and sealing cover 59, which itself may be protected by its own thermal pad 61, is preferably fastened on the flange 57, so as to protect the hollow area 19 in which the spring 17 is located.

A single cover may be local and dedicated to a single opening, or may cover all or part of the openings. The cover is maintained by fasteners allowing sealing and easy access to the hollow area 19.

In FIGS. 3 and 4, the arrow 63 indicates the direction of the forces exerted by the link rod 15 on the spring 17 in the thrust reversal situation, i.e. when each flap 13 is across the cold flow tunnel 7.

To limit the action of the forces of that link rod on said spring in that configuration, it is possible to provide that the spring 17 is configured so that the pin 43 abuts against the plate 25, as shown in FIG. 3, or so that the plate 25 includes a stop 64 making it possible to block the pin 43 under the pulling force exerted by the link rod 15, as shown in FIG. 4: this makes it possible to avoid any uplift risk on the spring 17.

As can be understood in light of the preceding, the arrangement according to the present disclosure makes it possible to offset the elastic connecting means of the link rod 15 with its surroundings in the internal fixed structure 5, and thereby makes it possible to reduce the bulk in the connecting area of said link rod 15 with its associated thrust reverser flap 13: in this way, it is possible to obtain a nacelle having the desired fineness of the aerodynamic lines.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An arrangement comprising a thrust reverser flap link rod on an internal fixed structure of a turbojet engine nacelle, the internal fixed structure defining, with a movable cowl, an annular passage through which an air flow passes, wherein said link rod is connected to the internal fixed structure by an elastic means comprising a spring and wherein said spring is fastened in a hollow area of said internal fixed structure, the hollow area formed through a surface of the internal fixed structure and provided with an opening for passage of said link rod.

2. The arrangement according to claim 1, wherein said spring is U-shaped with two branches.

3. The arrangement according to claim 2, wherein a concavity of said spring is oriented toward an upstream direction of said nacelle.

4. The arrangement according to claim 1, wherein said spring is a torsion spring.

5. The arrangement according to claim 1, wherein said link rod is connected to said spring by a connecting pin, and wherein shells with oblong openings receiving ends of said pin, are capable of retaining said pin in the event the spring breaks.

6. The arrangement according to claim 1, wherein when the internal fixed structure is made from a composite sandwich material, the hollow area is formed in a monolithic part of that material.

7. The arrangement according to claim 1, wherein said hollow area is bordered by a flange which itself is bordered by a thermally insulating cushion of a surface of the internal fixed structure.

8. The arrangement according to claim 7, wherein a protective cover is attached on the flange.

9. The arrangement according to claim 1, further comprising a stop limiting an uplift of the spring in a reverser mode.

10. An aircraft turbojet engine nacelle, comprising at least one arrangement according to claim 1.

\* \* \* \* \*